(12) United States Patent
Zhao et al.

(10) Patent No.: US 9,516,988 B2
(45) Date of Patent: Dec. 13, 2016

(54) WATER SPRAYING APPARATUS OF DISHWASHER AND DISHWASHER COMPRISING THE SAME

(75) Inventors: Weidong Zhao, Foshan (CN); Fang Tian, Foshan (CN)

(73) Assignees: Foshan Shunde Midea Washing Appliances Mfg. Co., Ltd., Foshan (CN); Midea Group Co., Ltd., Foshan (CN)

( * ) Notice: Subject to any disclaimer, the term of this patent is extended or adjusted under 35 U.S.C. 154(b) by 373 days.

(21) Appl. No.: 14/343,337

(22) PCT Filed: Sep. 7, 2012

(86) PCT No.: PCT/CN2012/081129
§ 371 (c)(1),
(2), (4) Date: May 13, 2014

(87) PCT Pub. No.: WO2013/034099
PCT Pub. Date: Mar. 14, 2013

(65) Prior Publication Data
US 2014/0299683 A1  Oct. 9, 2014

(30) Foreign Application Priority Data
Sep. 9, 2011  (CN) ............... 2011 2 0337266 U

(51) Int. Cl.
*F16L 27/08* (2006.01)
*A47L 15/42* (2006.01)
*A47L 15/23* (2006.01)

(52) U.S. Cl.
CPC ........... *A47L 15/4278* (2013.01); *A47L 15/23* (2013.01); *F16L 27/0804* (2013.01); *F16L 27/0849* (2013.01)

(58) Field of Classification Search
CPC .... F16L 27/08; F16L 27/0804; F16L 27/0837; F16L 27/0845; F16L 27/0849; F16L 15/23; F16L 37/53; F16L 41/18; A47L 15/428; A47L 15/4278; A47L 15/22
(Continued)

(56) References Cited

U.S. PATENT DOCUMENTS

| 2003/0127854 A1* | 7/2003 | Lehnhardt ............... F16L 21/06 285/181 |
| 2010/0186776 A1 | 7/2010 | Bittner |
| 2013/0180555 A1* | 7/2013 | Lee ....................... A47L 15/428 134/181 |

FOREIGN PATENT DOCUMENTS

| CN | 201189150 Y | 2/2009 |
| CN | 201333016 Y | 10/2009 |

(Continued)

OTHER PUBLICATIONS

PCT/CN2012/081129 English Translation of the International Search Report, mailed Dec. 27, 2012, 3 pages.

*Primary Examiner* — Jason Boeckmann
(74) *Attorney, Agent, or Firm* — Lathrop & Gage LLP

(57) ABSTRACT

A water spraying apparatus of a dishwasher and the dishwasher comprising the water spraying apparatus are provided. The water spraying apparatus comprises a water source connecting pipe having a water outlet tube, a spraying arm having a water inlet tube, and a connecting device connecting the water source connecting pipe with the spraying arm, in which the connecting device comprises first and second semicircular fitting rings which are adapted to snap-fit with each other to form a connecting ring, the connecting ring is rotatably fitted over the water outlet tube of the water source connecting pipe and positioned in an axial direction of the connecting ring between the water inlet tube of the spraying arm and the water outlet tube of the water source connecting pipe.

16 Claims, 6 Drawing Sheets

(58) Field of Classification Search
USPC .............. 239/214, 214.13, 214.11, 601
See application file for complete search history.

(56) References Cited

FOREIGN PATENT DOCUMENTS

| | | |
|---|---|---|
| CN | 201558087 U | 8/2010 |
| CN | 202235251 U | 5/2012 |

* cited by examiner

WATER SPRAYING APPARATUS OF DISHWASHER AND DISHWASHER COMPRISING THE SAME

FIELD

The present invention generally relates to dishwasher filed, more particularly, to a water spraying apparatus of a dishwasher and a dishwasher including the same.

BACKGROUND

The conventional water spraying apparatus disposed in a dishwasher generally includes a spraying arm which is an important functional component in the dishwasher. The design of the connecting device connecting the spraying arm with a water source device is the key of effectively saving space and improving the safety and reliability of the connection. The structure of the spraying arm and the connection fashion may directly influence the loading space and the water pressure relief volume of the dishwasher. In addition, the structure of the spraying arm and the connection fashion may indirectly influence washing performance, noise-proof feature and water consumption.

The connecting device of the spraying arm of the dishwasher in the related art is assembled by means of directly inserting a snapping tongue or rotating a nut. However, the above connecting device has the following defects: the space utilization of the dishwasher is low, thus directly influencing the effective size for loading the tableware in the total dishwasher and wasting some space, such that the improvement of the space utilization of the dishwasher is limited; in addition, the above two assembling fashions of the connecting devices result in two pressure relief surfaces, which may cause unnecessary pressure relief.

SUMMARY

The present invention seeks to solve at least one of the problems existing in the related art to at least some extend.

A first object of the present invention is to provide a water spraying apparatus of a dishwasher, in which a water source connecting pipe is fitted within a water inlet tube of the spraying arm to improve the water utilization.

A second object of the present invention is to provide a dishwasher including the water spraying apparatus.

Embodiments of a first aspect of the present invention provide a water spraying apparatus of a dishwasher including a water source connecting pipe having a water outlet tube, a spraying arm having a water inlet tube, and a connecting device connecting the water source connecting pipe with the spraying arm, wherein the connecting device includes first and second semicircular fitting rings which are adapted to snap-fit with each other to form a connecting ring, the connecting ring is rotatably fitted over the water outlet tube of the water source connecting pipe and positioned in an axial direction of the connecting ring between the water inlet tube of the spraying arm and the water outlet tube of the water source connecting pipe.

According to embodiments of the present invention, the rotation of the spraying arm about the water source connecting pipe is achieved by the connecting ring configured by the first and second semicircular fitting rings which are adapted to snap-fit with each other, and the water source connecting pipe is fitted within the water inlet tube of the spraying arm to avoid resulting in unnecessary pressure relief surfaces, reduce the water current pressure relief volume, improve the water current utilization and ensure the reliable connection. The connecting device according to embodiments of the present invention may break through the limitation of the size for loading the tableware in the effective space of the dishwasher, and be suitable for connecting the spraying arm disposed at any positions in the dishwasher in the related art with the water source via the water source connecting pipe. Furthermore, the connecting device has a simple and reliable structure and wide applicability.

In some embodiments, the first semicircular fitting ring is provided with a first snapping tongue and a first backstop rib, and the second semicircular fitting ring is provided with a second snapping tongue snap-fitted with the first backstop rib and a second backstop rib snap-fitted with the first snapping tongue.

In some embodiments, the first snapping tongue is disposed on a peripheral surface of the first semicircular fitting ring and adjacent to an engaging surface of the first semicircular fitting ring with the second semicircular fitting ring, and the second snapping tongue is disposed on a peripheral surface of the second semicircular fitting ring and adjacent to an engaging surface of the second semicircular fitting ring with the first semicircular fitting ring.

In some embodiments, the first semicircular fitting ring is further provided with a first positioning protrusion and a first positioning recess which are located on an engaging surface of the first semicircular fitting ring with the second semicircular fitting ring; and the second semicircular fitting ring is further provided with a second positioning protrusion and a second positioning recess which are located on an engaging surface of the second semicircular fitting ring with the first semicircular fitting ring, in which the first positioning protrusion is fitted with the second positioning recess, and the first positioning recess is fitted with the second positioning protrusion, thus further snap-fitting the first and second semicircular fitting rings with each other.

In some embodiments, the first positioning protrusion is located on an engaging surface of the first semicircular fitting ring with the second semicircular fitting ring; and the second positioning protrusion is located on an engaging surface of the second semicircular fitting ring with the first semicircular fitting ring, in which the first and second positioning protrusions are centrosymmetric with respect to an axis of the connecting ring.

In some embodiments, at least two first pressure relief grooves are formed in an inner wall surface of the first semicircular fitting ring, and extend upwards to an upper surface of the first semicircular fitting ring, in which a first pressure relief platform is formed at a bottom of the first pressure relief groove; and at least two second pressure relief grooves are formed in an inner wall surface of the second semicircular fitting ring, and extend upwards to an upper surface of the second semicircular fitting ring, in which a second pressure relief platform is formed at a bottom of the second pressure relief groove.

By forming the first and second pressure relief grooves, the necessary pressure relief may be achieved during the operation of the dishwasher. Specifically, since residual particles and other waste particles are present in the dishwasher, when the spraying arm is rotated, the waste particles are deposited onto the first pressure relief platform of the first pressure relief groove and the second pressure relief platform of the second pressure relief groove. However, when the high-pressure water current enters into the spraying arm via the water outlet tube of the water source connecting pipe, some of the high-pressure water current may enter into a space between the connecting device and an outer wall of the water outlet tube to form an annular pressure relief surface so as to flush the first and second pressure relief grooves, thus flushing the waste particles between the water outlet tube and the connecting device and avoiding influence upon the rotation of the spraying arm due to the excessive resistance caused by the waste particles.

In some embodiments, the first pressure relief groove is configured to have a cross section of an irregular polygon and have at least one bevel which is inclined inwardly toward an engaging surface of the first semicircular fitting ring with the second semicircular fitting ring, and the second pressure relief groove is configured to have a cross section of an irregular polygon and have at least one bevel which is inclined inwardly toward an engaging surface of the second semicircular fitting ring with the first semicircular fitting ring.

By providing bevels in the first and second pressure relief grooves, the water flushes the waste particles along a direction of the bevel so as to obtain a better washing effect.

In some embodiments, the first pressure relief grooves are symmetrical with the second pressure relief grooves respectively.

In some embodiments, the connecting device further includes: holding portions disposed at outer edges of top surfaces of the first and second semicircular fitting rings respectively and extended outwards.

In some embodiments, a first flange is disposed at an end of the water outlet tube of the water source connecting pipe and extended outwards in a radial direction of the water outlet tube, and the connecting device is rotatably fitted over the water outlet tube and positioned onto the first flange in the axial direction.

In some embodiments, a first supporting bar is formed on a contact surface of the first semicircular fitting ring with the first flange, has a semicircular shape and is coaxial with the first semicircular fitting ring; and a second supporting bar is formed on a contact surface of the second semicircular fitting ring with the first flange, has a semicircular shape and is coaxial with the second semicircular fitting ring.

By providing the first and second supporting bars, the friction between the first and second semicircular fitting rings and the upper surface of the first flange is reduced.

In some embodiments, a second flange is formed at an end of the water inlet tube of the spraying arm and extended inwards in a radial direction of the water inlet tube, and an annular groove is formed in a peripheral surface of the connecting ring in a circumferential direction of the connecting ring, in which the second flange is fitted in the annular groove to connect the water inlet tube to the connecting device.

In some embodiments, an annular sealing rib is disposed on a fitting surface of the second flange with the annular groove. Thus, an annular sealing surface is formed between the annular sealing rib and a top wall of the annular groove, thus achieving a good sealing effect.

In some embodiments, the annular sealing rib is coaxial with the connecting ring.

In some embodiments, an annular sealing groove is formed in the top wall of the annular groove and the annular sealing rib is fitted within the annular sealing groove. Thus, the interference fit between the annular sealing rib and the annular sealing groove may be achieved to form a tight annular sealing surface so as to obtain a better sealing effect.

In some embodiments, a plurality of arc-shaped fitting blocks are disposed onto an inner wall of the water inlet tube of the spraying arm, extended in a circumferential direction of the water inlet tube, and spaced apart from each other in the circumferential direction, in which a first extension portion is extended from a periphery of the first semicircular fitting ring outwards in a radial direction of the first semicircular fitting ring, and a second extension portion is extended from a periphery of the second semicircular fitting ring outwards in a radial direction of the second semicircular fitting ring, in which the first and second extension portions are supported onto the arc-shaped fitting blocks respectively.

In some embodiments, a positioning boss is disposed at a top surface of each of the arc-shaped fitting blocks and adjacent to the inner wall of the water inlet tube, and a positioning groove into which the positioning boss is fitted is formed in each of the first and the second extension portions.

With the water spraying apparatus according to embodiments of the present invention, it is possible to effectively make use of the inner space of the water inlet tube of the spraying arm, to avoid presence of the unnecessary pressure relief surfaces, to achieve the effective utilization of the water current in the annular pressure relief surface and to improve the utilization of the total water current. Meanwhile, it is possible to increase the effective size for loading the tableware in the limited space of the dishwasher so as to improve the space utilization.

Embodiments of a second aspect of the present invention provide a dishwasher including the water spraying apparatus according to embodiments of the first aspect of the present invention.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
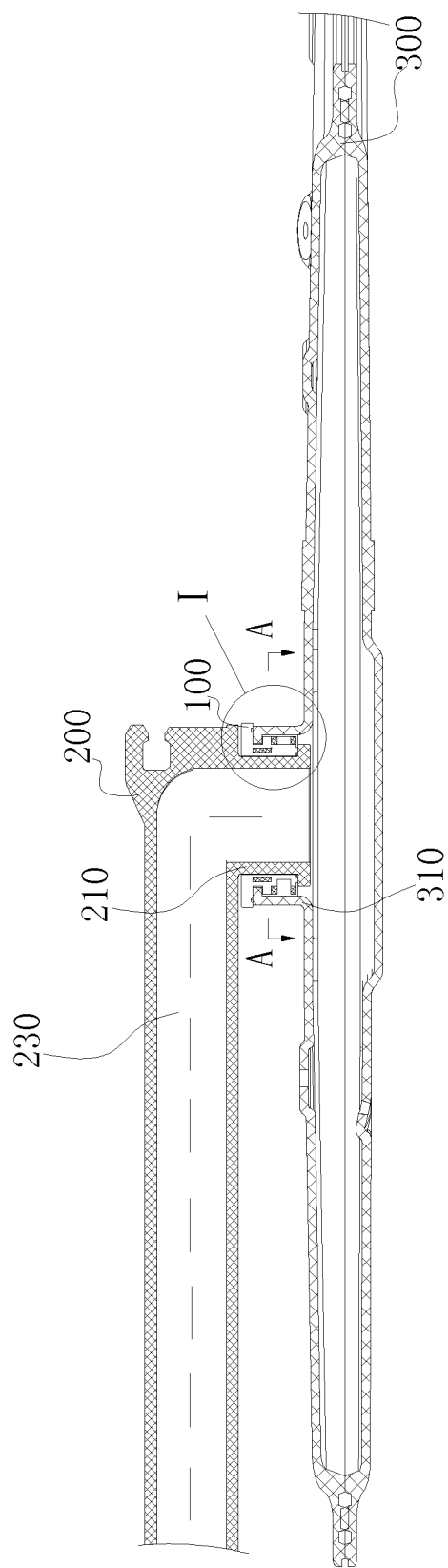
FIG. 1 is a schematic view of a water spraying apparatus of a dishwasher according to an embodiment of the present invention.

Reference will be made in detail to embodiments of the present invention. The same or similar elements and the elements having same or similar functions are denoted by like reference numerals throughout the descriptions. The embodiments described herein with reference to drawings are explanatory, illustrative, and used to generally understand the present invention. The embodiments shall not be construed to limit the present invention.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of the technical features. Thus, the technical feature limited by "first" and "second" may indicate or imply to include one or more technical features. In the description of the present invention, "a plurality of" means two or more than two, unless otherwise specified.

Firstly, a water spraying apparatus of a dishwasher according to embodiments of the present invention will be described with reference to FIGS. 1 to 10, in which the water spraying apparatus is disposed within the dishwasher to spray water onto the tableware placed in the dishwasher.

As shown in FIG. 1, the water spraying apparatus includes a water source connecting pipe 200 for supplying water and a spraying arm 300 for spraying water in the dishwasher. A water inlet tube 310 of the spraying arm 300 is connected with a water outlet tube 210 of the water source connecting pipe 200 via a connecting device 100. In the following description, by way of example and without limitation, both the water inlet tube 310 of the spraying arm 300 and the water outlet tube 210 of the water source connecting pipe 200 connected with each other via the connecting device 100 are extended vertically. Those having ordinary skill in the art will appreciate that the water inlet tube 310 and the water outlet tube 210 are not limited to be extended vertically shown in FIG. 1, but may be extended in any direction and connected with each other via the connecting device 100.

Figure 2:
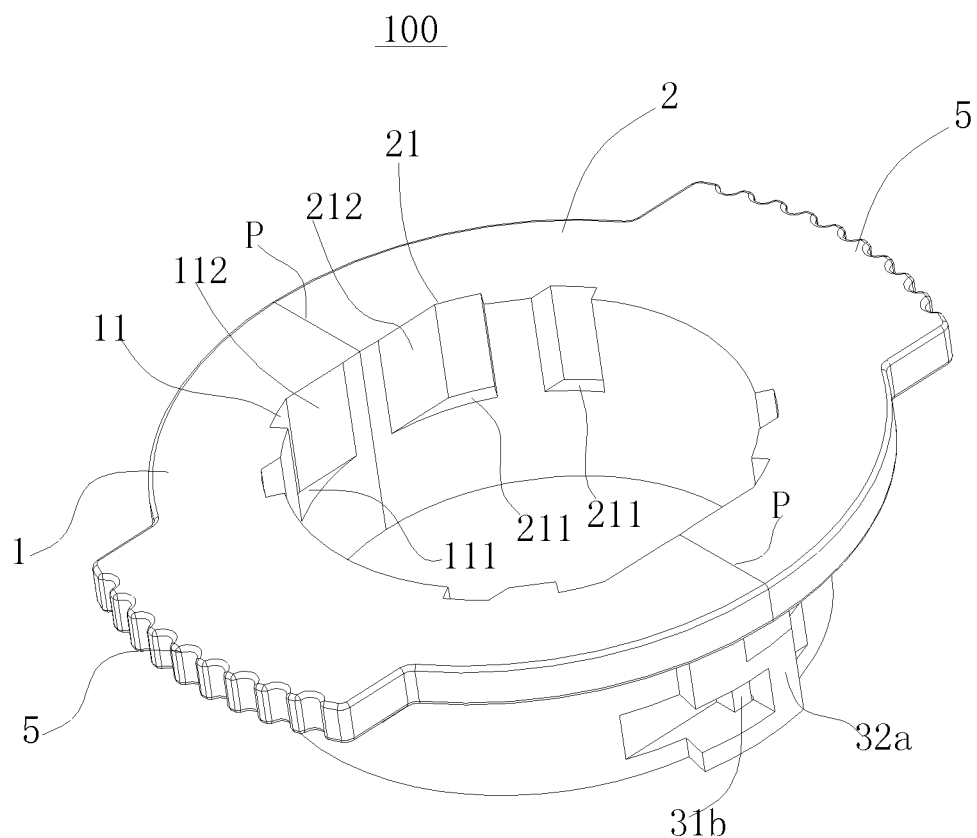
FIG. 2 is a schematic perspective view of an example of a connecting device of the water spraying apparatus in FIG. 1.

As shown in FIGS. 1 and 2, the connecting device 100 includes a first semicircular fitting ring 1 and a second semicircular fitting ring 2 which both have a semicircular shape and are configured to snap-fit with each other to form a connecting ring, the connecting ring is rotatably fitted over the water outlet tube 210 of the water source connecting pipe 200 and positioned in an axial direction of the connecting ring between the water inlet tube 310 of the spraying arm 300 and the water outlet tube 210 of the water source connecting pipe 200. In other words, the water outlet tube 210 of the water source connecting pipe 200 is fitted within the water inlet tube 310 of the spraying arm 300 via the connecting ring, as shown in FIG. 1.

According to embodiments of the present invention, the rotation of the spraying arm 300 about the water source connecting pipe 200 is achieved via the connecting ring formed by the first and second semicircular fitting rings 1, 2 which are snap-fitted with each other, and the water source connecting pipe 200 is fitted within the water inlet tube 310 of the spraying arm 300 to avoid forming unnecessary pressure relief surfaces, reduce the water current pressure relief volume, improve the water current utilization and ensure the reliable connection at the same time. The connecting device 100 according to embodiments of the present invention may break through the limitation of the size for loading the tableware in the effective space of the dishwasher, and be suitable for connecting the spraying arm 300 disposed at any positions in the dishwasher with the water source via the water source connecting pipe 200. Furthermore, the connecting device 100 has a simple and reliable structure and wide applicability.

In addition, as shown in FIGS. 2 to 6, those having ordinary skill in the art will appreciate that, after the first semicircular fitting ring 1 and the second semicircular fitting ring 2 are snap-fitted with each other, two engaging surfaces P are formed between the first semicircular fitting ring 1 and the second semicircular fitting ring 2, in which the two engaging surfaces P are symmetrical with respect to a center of the connecting ring formed by the first semicircular fitting ring 1 and the second semicircular fitting ring 2 snap-fitted with each other.

Figure 6:
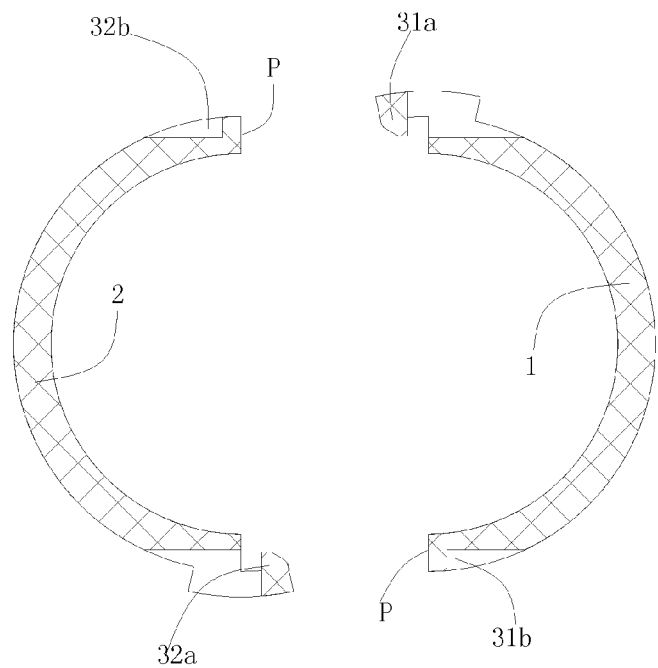
FIG. 6 is a sectional view taken along line D-D in FIG. 4.

As shown in FIG. 6, the first semicircular fitting ring 1 is provided with a first snapping tongue 31a and a first backstop rib 31b, and the second semicircular fitting ring 2 is provided with a second snapping tongue 32a and a second backstop rib 32b.

The first backstop rib 31b is snap-fitted with the second snapping tongue 32a, and the second backstop rib 32b is snap-fitted with the first snapping tongue 31a, such that the first semicircular fitting ring 1 and the second semicircular fitting ring 2 are snap-fitted with each other. Specifically, as shown in FIGS. 2 and 6, the first snapping tongue 31a is disposed on a peripheral surface of the first semicircular fitting ring 1 and adjacent to an engaging surface P of the first semicircular fitting ring 1 with the second semicircular fitting ring 2, and the second snapping tongue 32a is disposed on a peripheral surface of the second semicircular fitting ring 2 and adjacent to an engaging surface P of the second semicircular fitting ring 2 with the first semicircular fitting ring 1. Thus, the first backstop rib 31b and the second snapping tongue 32a are snap-fitted with each other adjacent to one engaging surface P of the first semicircular fitting ring 1 and the second semicircular fitting ring 2, and the second backstop rib 32b and the first snapping tongue 31a are snap-fitted with each other adjacent to the other engaging surface P of the first semicircular fitting ring 1 and the second semicircular fitting ring 2.

Figure 3:
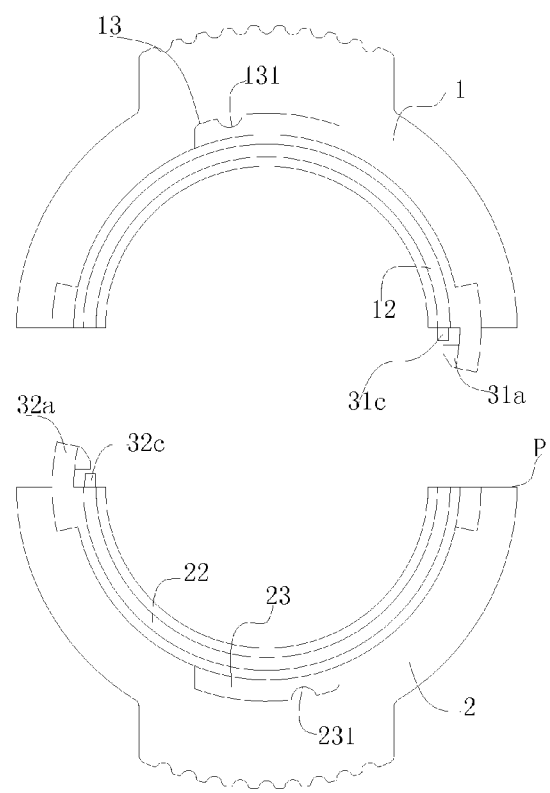
FIG. 3 is an exploded bottom view of the connecting device in FIG. 2.
Figure 4:
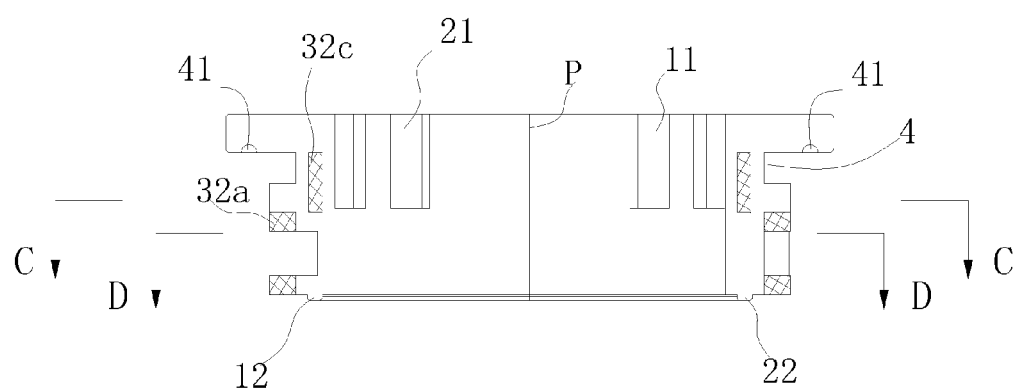
FIG. 4 is a schematic view illustrating connection of the first and second semicircular fitting rings of the connection device in FIG. 2.
Figure 5:
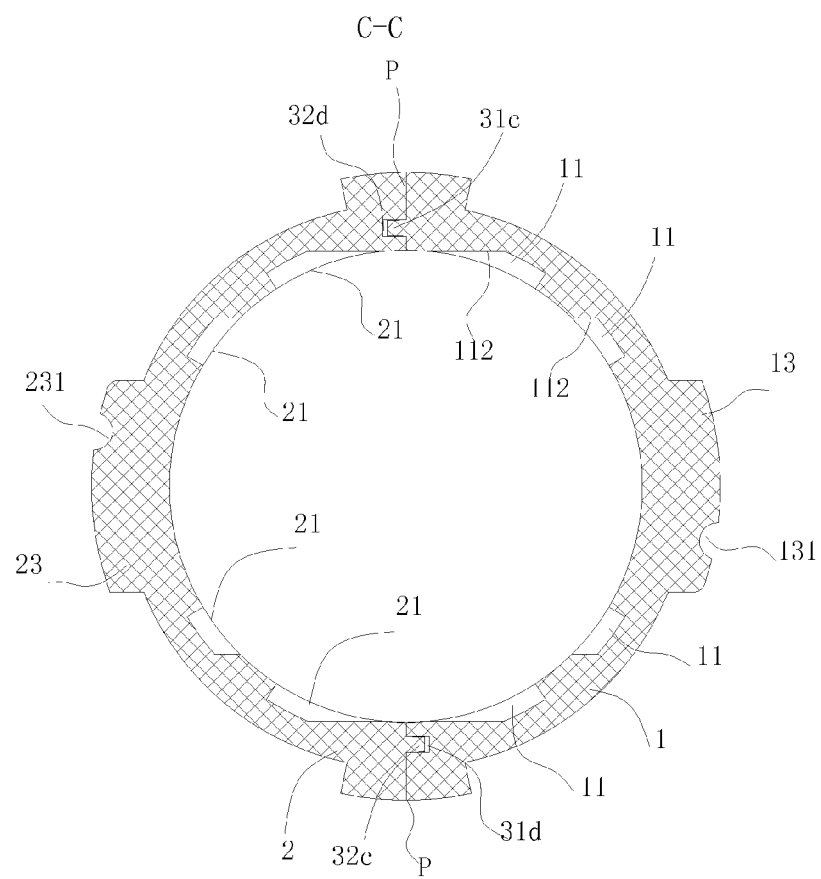
FIG. 5 is a sectional view taken along line C-C in FIG. 4.

As shown in FIGS. 3 to 5, in a further embodiment of the present invention, the first semicircular fitting ring 1 is further provided with a first positioning protrusion 31c and a first positioning recess 31d which are formed on an engaging surface P of the first semicircular fitting ring 1 with the second semicircular fitting ring 2 and spaced apart from each other. The second semicircular fitting ring 2 is further provided with a second positioning protrusion 32c and a second positioning recess 32d which are formed on an engaging surface P of the second semicircular fitting ring 2 with the first semicircular fitting ring 1 and spaced apart from each other. The first positioning protrusion 31c is fitted with the second positioning recess 32d, and the first positioning recess 31d is fitted with the second positioning protrusion 32c, such that the first semicircular fitting ring 1 and the second semicircular fitting ring 2 are further snap-fitted with each other.

In some embodiments, as shown in FIGS. 3 and 5, the first positioning protrusion 31c and the second positioning protrusion 32c are centrosymmetric with respect to an axis of the connecting ring.

In some preferable embodiments, at least two first pressure relief grooves 11 are formed in an inner wall surface of the first semicircular fitting ring 1, and extend upwards to an upper surface of the first semicircular fitting ring 1, in which a first pressure relief platform 111 is formed at a bottom of the first pressure relief groove 11. At least two second pressure relief grooves 21 are formed in an inner wall surface of the second semicircular fitting ring 2, and extend upwards to an upper surface of the second semicircular fitting ring 2, in which a second pressure relief platform 211 is formed at a bottom of the second pressure relief groove 21.

By forming the first pressure relief groove 11 and the second pressure relief groove 21, the necessary pressure relief may be achieved during the operation of the spraying arm 300. Specifically, since residual particles and other waste particles are present in the dishwasher, when the spraying arm 300 is rotated, the waste particles are deposited onto the first pressure relief platform 111 of the first pressure relief groove 11 and the second pressure relief platform 211 of the second pressure relief groove 21. However, when the high-pressure water current enters into the spraying arm 300 via the water outlet tube 210 of the water source connecting pipe 200, some high-pressure water current may enter into a space between the connecting device 100 and an outer wall of the water outlet tube 210 to form an annular pressure relief surface so as to flush the first pressure relief groove 11 and the second pressure relief groove 21, thus flushing the waste particles between the water outlet tube 210 and the connecting device 100 and avoiding influence upon the rotation of the spraying arm 300 due to the excessive resistance caused by the waste particles.

Specifically, the first pressure relief groove 11 is configured to have a cross section of an irregular polygon and have at least one bevel which is inclined inwardly towards an engaging surface P of the first semicircular fitting ring 1 with the second semicircular fitting ring 2. The second pressure relief groove 21 is configured to have a cross section of an irregular polygon and have at least one bevel which is inclined inwardly towards an engaging surface P of the second semicircular fitting ring 2 with the first semicircular fitting ring 1. By forming bevels in the first pressure relief groove 11 and the second pressure relief groove 21, the water current may flush in a direction of the bevel so as to improve the washing effect. As shown in FIGS. 2 and 5, the first pressure relief groove 11 has two bevels 112, and the second pressure relief groove 21 has two bevels 212. In some embodiments, as shown in FIG. 5, the number of the first pressure relief grooves 11 is four, and the number of the second pressure relief grooves 21 is four. Certainly, the present invention is not limited to this, and there may be a plurality of the first pressure relief grooves 11 and a plurality of the second pressure relief grooves 21. In some embodiments, the first pressure relief grooves 11 are symmetrical with the second pressure relief grooves 21 respectively.

As shown in FIG. 2, in some embodiments of the present invention, the connecting device 100 further includes: holding portions 5 disposed at outer edges of top surfaces of the first semicircular fitting ring 1 and the second semicircular fitting ring 2 respectively and extended outwards so as to be suitable for being held by a user. In some embodiments, the number of the holding portions 5 is two and the two holding portions 5 are symmetrically disposed on the first semicircular fitting ring 1 and the second semicircular fitting ring 2 respectively. Alternatively, the holding portion 5 further includes a ripple portion suitable for being held by the user's fingers. Thus, a user may take off the first semicircular fitting ring 1 and the second semicircular fitting ring 2 from the water outlet tube 210 of the water source connecting pipe 200 by gripping the holding portion 5.

As shown in FIG. 1, the water inlet tube 310 of the spraying arm 300 is connected with the water outlet tube 210 of the water source connecting pipe 200 via the connecting device 100. In some embodiments, a first flange 220 is disposed at an end of the water outlet tube 210 of the water source connecting pipe 200 and extended outwards in a radial direction of the water outlet tube 210, and the connecting device 100 is rotatably fitted over the water outlet tube 210 and positioned onto the first flange 220 in the axial direction of the connecting ring. In some embodiments, the water source connecting pipe 200 may be formed as an L-shaped pipe including a horizontal pipe 230 extended horizontally and a vertical pipe 210 extended vertically, as shown in FIG. 1. Thus, the connecting device 100 may be fitted over the water outlet tube 210 and between the first flange 220 and the horizontal pipe 230 so as to be positioned in the axial direction.

Figure 7:
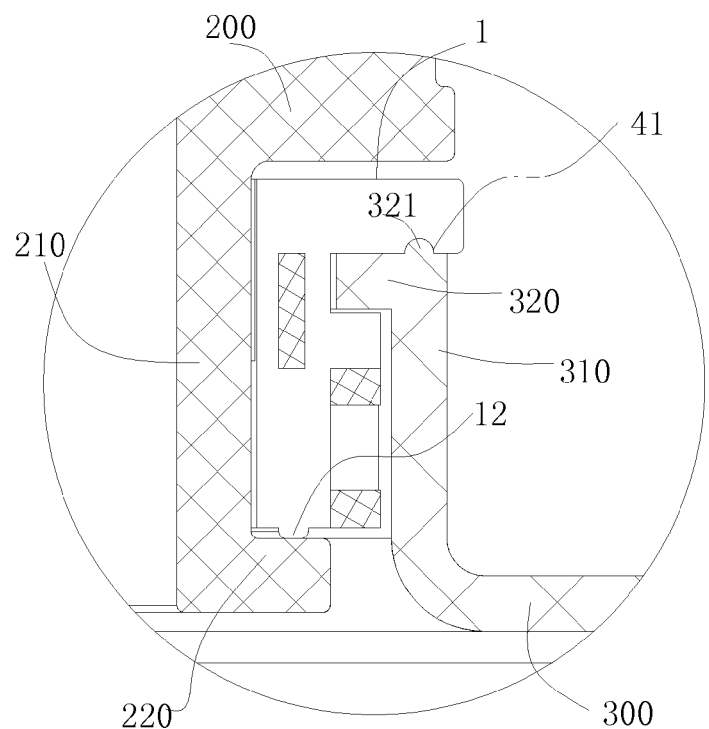
FIG. 7 is a schematic enlarged view of Portion I in FIG. 1.
Figure 8:
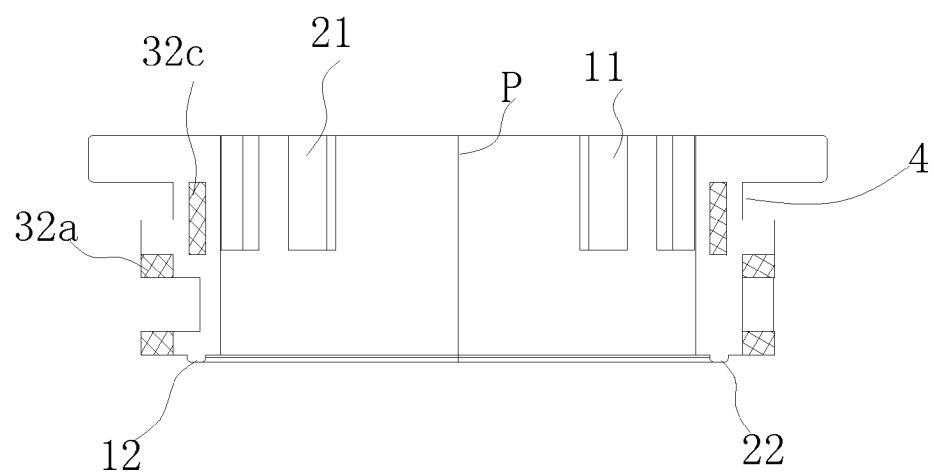
FIG. 8 is a schematic view illustrating connection of the first and second semicircular fitting rings in another example of the connecting device of the water spraying apparatus in FIG. 1.

In further embodiments of the present invention, as shown in FIGS. 4, 7 and 8, a first supporting bar 12 is formed on a contact surface of the first semicircular fitting ring 1 with the first flange 220, has a semicircular shape and is coaxial with the first semicircular fitting ring 1. Correspondingly, a second supporting bar 22 is formed on a contact surface of the second semicircular fitting ring 2 with the first flange 220, has a semicircular shape and is coaxial with the second semicircular fitting ring 2.

By forming the first supporting bar 12 and the second supporting bar 22, the friction between the first semicircular fitting ring 1 and the upper surface of the first flange 220, as well as between the second semicircular ring 2 and the upper surface of the first flange 220 is reduced.

In some embodiments of the present invention, as shown in FIG. 7, a second flange 320 is formed at an end of the water inlet tube 310 of the spraying arm 300 and extended inwards in a radial direction of the water inlet tube 310, and an annular groove 4 is formed in a peripheral surface of the connecting ring in a circumferential direction of the connecting ring, as shown in FIG. 4, in which the second flange 320 is fitted in the annular groove 4 to connect the water inlet tube 310 with the connecting device 100.

For the sake of sealing, an annular sealing rib 321 is disposed on a fitting surface of the second flange 320 with the annular groove 4. Thus, an annular sealing surface may be formed between the annular sealing rib 321 and a top wall of the annular groove 4, thus improving the sealing effect. Alternatively, the annular sealing rib 321 is coaxial with the connecting ring.

In some embodiments, an annular sealing groove 41 is formed in the top wall of the annular groove 4 and the annular sealing rib 321 is fitted within the annular sealing groove 41, as shown in FIGS. 4 and 7. Thus, the interference fit between the annular sealing rib 321 and the annular sealing groove 41 may be achieved to form a tight annular sealing surface so as to improve the sealing effect. Certainly, those having ordinary skill in the art will appreciate that, the annular sealing groove 41 in the top wall of the annular groove 4 may be omitted, as shown in FIG. 8. Thus, the annular sealing rib 321 may be contacted with the top wall of the annular groove 4 directly to form an annular sealing surface so as to improve the sealing effect.

Further, as shown in FIGS. 3, 5, 9 and 10, a plurality of arc-shaped fitting blocks 330 are disposed onto an inner wall of the water inlet tube 310 of the spraying arm 300, extended in a circumferential direction of the water inlet tube 310, and spaced apart from each other in the circumferential direction. Further, a first extension portion 13 is extended from a periphery of the first semicircular fitting ring 1 outwards in a radial direction of the first semicircular fitting ring 1, and a second extension portion 23 is extended from a periphery of the second semicircular fitting ring 2 outwards in a radial direction of the second semicircular fitting ring 2, in which the first and second extension portions 13, 23 are supported onto the arc-shaped fitting blocks 330 respectively. Therefore, the first semicircular fitting ring 1 and the second semicircular fitting ring 2 may be positioned in the axial direction.

Figure 9:
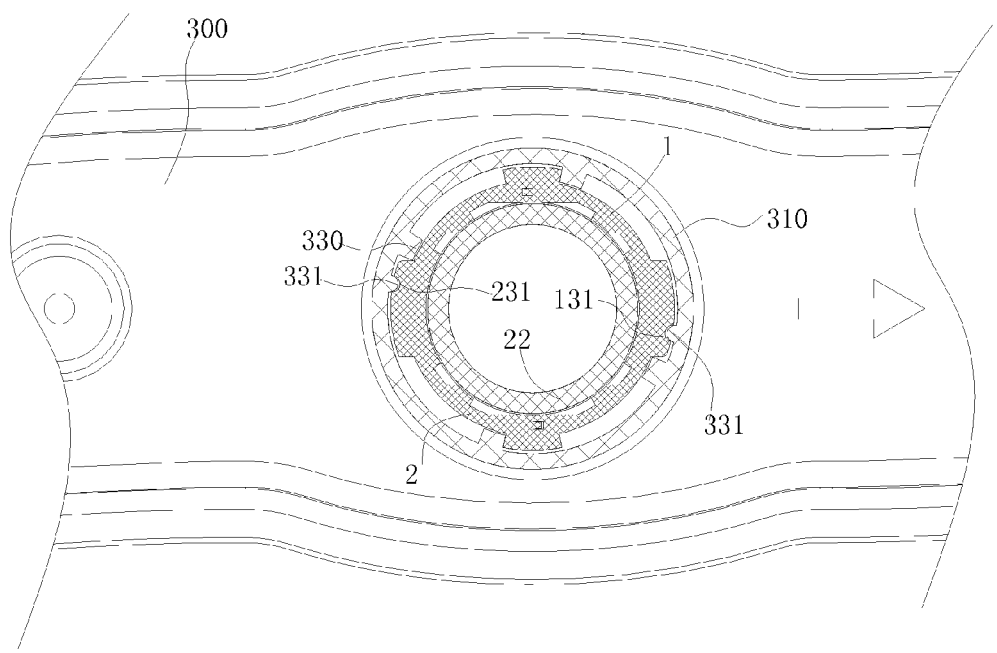
FIG. 9 is a sectional and enlarged view taken along line A-A in FIG. 1.
Figure 10:
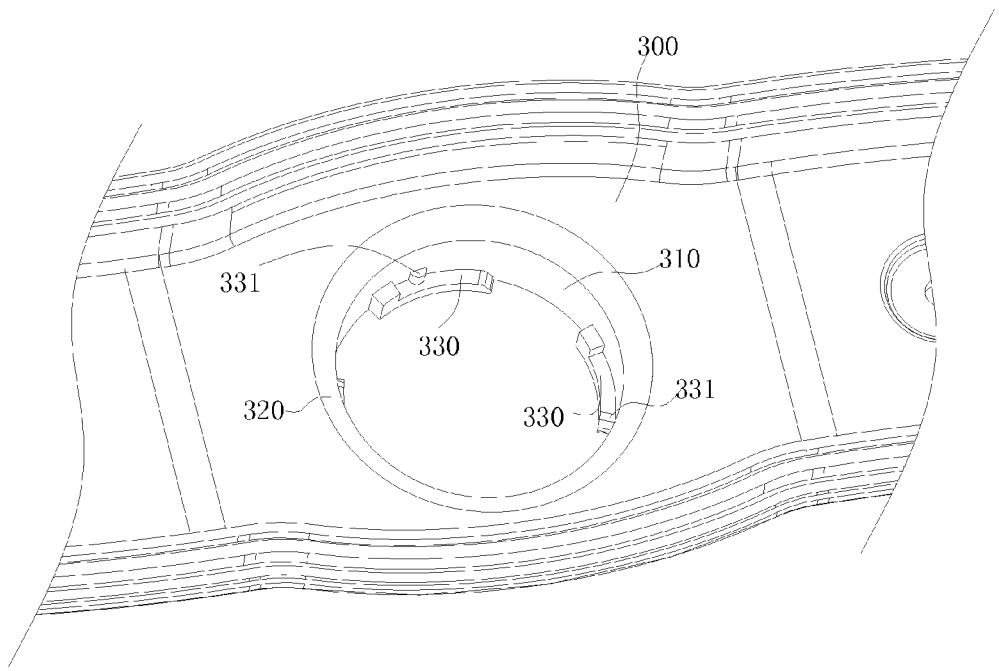
FIG. 10 is a top-side view of the water inlet tube of the spraying arm of the water spraying apparatus in FIG. 1.

Alternatively, as shown in FIGS. 9 and 10, a positioning boss 331 is disposed at a top surface of each of the arc-shaped fitting blocks 330 and adjacent to the inner wall of the water inlet tube 310. Correspondingly, a first positioning groove 131 into which the positioning boss 331 is fitted is formed in the first extension portion 13, and a second positioning groove 231 into which the positioning boss 331 is fitted is formed in the second extension portion 23. Thus, the spraying arm 300 rotates in a direction in which the first extension portion 13 and the second extension portion 23 are fitted with the positioning bosses 331 respectively, and the spraying arm 300 will not disengage from the first semicircular fitting ring 1 and the second semicircular fitting ring 2, thus further achieving the positioning of the first semicircular fitting ring 1 and the second semicircular fitting ring 2 in the water inlet tube 310 of the spraying arm 300 in the axial direction and the circumferential direction of the connecting ring.

The operation of the water spraying apparatus according to embodiments of the present invention will be described in the following with reference to FIGS. 1 to 10.

When the water spraying apparatus operates, the water current enters into the spraying arm 300 from the water source via the water source connecting pipe 200 to spray water onto the tableware in the dishwasher, in which the spray arm 300 rotates in a predetermined direction so as not to disengage from the first semicircular fitting ring 1 and the second semicircular fitting ring 2. Meanwhile, due to the action of gravitation, when the high-pressure water current enters into the spraying arm 300 via the water outlet tube 210 of the water source connecting pipe 200, some high-pressure water current may enter into the space between the connecting device 100 and the outer wall of the water outlet tube 210 of the water source connecting pipe 200 to form the annular pressure relief surface so as to flush the first pressure relief groove 11 and the second pressure relief groove 21, thus flushing the particles between the water outlet tube 210 and the connecting device 100 and avoiding influence upon the rotation of the spraying arm 300 due to the excessive resistance caused by the particles.

With the water spraying apparatus according to embodiments of the present invention, it is possible to effectively make use of the inner space of the water inlet tube 310 of the spraying arm 300, to avoid presence of the unnecessary pressure relief surfaces, to achieve the effective utilization of the water current in the annular pressure relief surface and to improve the utilization of the total water current. Meanwhile, it is possible to increase the effective size for loading the tableware in the limited space of the dishwasher so as to improve the space utilization.

According to embodiments of the present invention, other components of the water spraying apparatus, such as the water source, the water source connecting pipe 200 and the spraying arm 300, which are well known to those having ordinary skill in the art, are omitted herein.

Embodiments of another aspect of the present invention provide a dishwasher including the water spraying apparatus described with reference to the above embodiments of the present invention.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A water spraying apparatus of a dishwasher comprising:
    a water source connecting pipe having a water outlet tube,
    a spraying arm having a water inlet tube, and
    a connecting device connecting the water source connecting pipe with the spraying arm, wherein the connecting device comprises first and second semicircular fitting rings which are adapted to snap-fit with each other to form a connecting ring, the connecting ring is rotatably fitted over the water outlet tube of the water source connecting pipe and positioned in an axial direction of the connecting ring between the water inlet tube of the spraying arm and the water outlet tube of the water source connecting pipe;
    wherein the first semicircular fitting ring is provided with a first snapping tongue and a first backstop rib, and the second semicircular fitting ring is provided with a second snapping tongue snap-fitted with the first backstop rib and a second backstop rib snap-fitted with the first snapping tongue;
    wherein the first snapping tongue is disposed on a peripheral surface of the first semicircular fitting ring and adjacent to an engaging surface of the first semicircular fitting ring with the second semicircular fitting ring, and the second snapping tongue is disposed on a peripheral surface of the second semicircular fitting ring and adjacent to an engaging surface of the second semicircular fitting ring with the first semicircular fitting ring.

2. The water spraying apparatus according to claim 1, wherein the first semicircular fitting ring is further provided with a first positioning protrusion and a first positioning recess which are located on an engaging surface of the first semicircular fitting ring with the second semicircular fitting ring; and
    the second semicircular fitting ring is further provided with a second positioning protrusion and a second positioning recess which are located on an engaging surface of the second semicircular fitting ring with the first semicircular fitting ring;

wherein the first positioning protrusion is fitted with the second positioning recess, and the first positioning recess is fitted with the second positioning protrusion.

3. The water spraying apparatus according to claim 2, wherein the first and second positioning protrusions are centrosymmetric with respect to an axis of the connecting ring.

4. The water spraying apparatus according to claim 1, wherein at least two first pressure relief grooves are formed in an inner wall surface of the first semicircular fitting ring, and extend upwards to an upper surface of the first semicircular fitting ring, wherein a first pressure relief platform is formed at a bottom of the first pressure relief groove; and at least two second pressure relief grooves are formed in an inner wall surface of the second semicircular fitting ring, and extend upwards to an upper surface of the second semicircular fitting ring, wherein a second pressure relief platform is formed at a bottom of the second pressure relief groove.

5. The water spraying apparatus according to claim 4, wherein the first pressure relief groove is configured to have a cross section of an irregular polygon and have at least one bevel which is inclined inwardly toward an engaging surface of the first semicircular fitting ring with the second semicircular fitting ring, wherein the second pressure relief groove is configured to have a cross section of an irregular polygon and have at least one bevel which is inclined inwardly toward an engaging surface of the second semicircular fitting ring with the first semicircular fitting ring.

6. The water spraying apparatus according to claim 4, wherein the first pressure relief grooves are symmetrical with the second pressure relief grooves respectively.

7. The water spraying apparatus according to claim 1, wherein the connecting device further comprises:

holding portions disposed at outer edges of top surfaces of the first and second semicircular fitting rings respectively and extended outwards.

8. The water spraying apparatus according to claim 7, wherein a first flange is disposed at an end of the water outlet tube of the water source connecting pipe and extended outwards in a radial direction of the water outlet tube, and the connecting device is rotatably fitted over the water outlet tube and positioned onto the first flange in the axial direction.

9. The water spraying apparatus according to claim 8, wherein a first supporting bar is formed on a contact surface of the first semicircular fitting ring with the first flange, has a semicircular shape and is coaxial with the first semicircular fitting ring; and a second supporting bar is formed on a contact surface of the second semicircular fitting ring with the first flange, has a semicircular shape and is coaxial with the second semicircular fitting ring.

10. The water spraying apparatus according to claim 1, wherein a second flange is formed at an end of the water inlet tube of the spraying arm and extended inwards in a radial direction of the water inlet tube, and an annular groove is formed in a peripheral surface of the connecting ring in a circumferential direction of the connecting ring, wherein the second flange is fitted in the annular groove to connect the water inlet tube to the connecting device.

11. The water spraying apparatus according to claim 10, wherein an annular sealing rib is disposed on a fitting surface of the second flange with the annular groove.

12. The water spraying apparatus according to claim 11, wherein the annular sealing rib is coaxial with the connecting ring.

13. The water spraying apparatus according to claim 10, wherein an annular sealing groove is formed in a top wall of the annular groove and the annular sealing rib is fitted within the annular sealing groove.

14. The water spraying apparatus according to claim 10, wherein a plurality of arc-shaped fitting blocks are disposed onto an inner wall of the water inlet tube of the spraying arm, extended in a circumferential direction of the water inlet tube, and spaced apart from each other in the circumferential direction, wherein a first extension portion is extended from a periphery of the first semicircular fitting ring outwards in a radial direction of the first semicircular fitting ring, and a second extension portion is extended from a periphery of the second semicircular fitting ring outwards in a radial direction of the second semicircular fitting ring, wherein the first and second extension portions are supported onto the arc-shaped fitting blocks respectively.

15. The water spraying apparatus according to claim 14, wherein a positioning boss is disposed at a top surface of each of the arc-shaped fitting blocks and adjacent to the inner wall of the water inlet tube, and a positioning groove into which the positioning boss is fitted is formed in each of the first and the second extension portions.

16. A dishwasher comprising a water spraying apparatus, wherein the spraying apparatus comprises:

a water source connecting pipe having a water outlet tube,
a spraying arm having a water inlet tube, and
a connecting device connecting the water source connecting pipe with the spraying arm, wherein the connecting device comprises first and second semicircular fitting rings which are adapted to snap-fit with each other to form a connecting ring, the connecting ring is rotatably fitted over the water outlet tube of the water source connecting pipe and positioned in an axial direction of the connecting ring between the water inlet tube of the spraying arm and the water outlet tube of the water source connecting pipe;

wherein the first semicircular fitting ring is provided with a first snapping tongue and a first backstop rib, and the second semicircular fitting ring is provided with a second snapping tongue snap-fitted with the first backstop rib and a second backstop rib snap-fitted with the first snapping tongue;

wherein the first snapping tongue is disposed on a peripheral surface of the first semicircular fitting ring and adjacent to an engaging surface of the first semicircular fitting ring with the second semicircular fitting ring, and the second snapping tongue is disposed on a peripheral surface of the second semicircular fitting ring and adjacent to an engaging surface of the second semicircular fitting ring with the first semicircular fitting ring.

* * * * *